J. O. MaCLASKY.
Improvement in Thill-Couplings.
No. 130,815.    Patented Aug. 27, 1872.
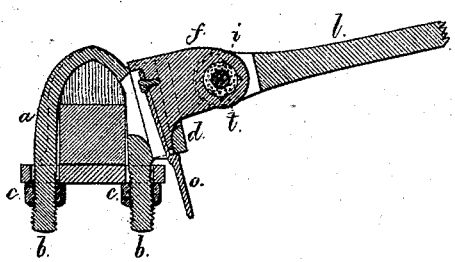
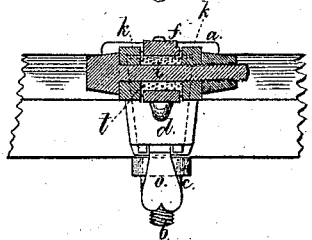
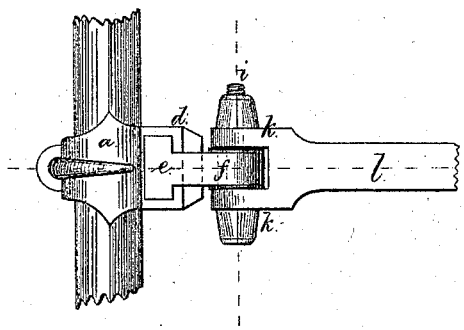
Witnesses
Cha. H. Smith
Harold Serrell
Inventor
Joseph O. MaClasky,
Lemuel W. Serrell
atty.

UNITED STATES PATENT OFFICE.

JOSEPH O. MACLASKY, OF PERTH AMBOY, ASSIGNOR TO HIMSELF AND ELIHU H. ROPES, OF ELIZABETH, NEW JERSEY.

IMPROVEMENT IN THILL-COUPLINGS.

Specification forming part of Letters Patent No. 130,815, dated August 27, 1872.

*To all to whom it may concern:*

Be it known that I, JOSEPH O. MACLASKY, of Perth Amboy, in the county of Middlesex and State of New Jersey, have invented an Improvement in Carriage-Shaft Couplings, and the following is declared to be a correct description thereof.

The shafts of carriages are usually attached to the axles by clips and bolts, and when it is desired to detach the shafts for substituting a pole or the reverse, it is necessary to remove the bolts that pass through the jaws of the clips. This consumes considerable time. Besides this it frequently happens that the space within a stable is limited, and that it is important to take off the shafts or pole after using the vehicle, so as not to be in the way.

Movable clips have been proposed, but they have been objectionable on account of the unsightly appearance, the cost, or the fact of their wearing loose.

My device is not subject to these objections, and it gives every facility for connecting or disconnecting the shafts or pole; and, when connected with the axle, the parts are as strong, durable, and reliable as the clips heretofore employed.

I make use of a wedge and spring connected with the joint of the shaft or pole strap, and upon the axle-clip is a wedge-shaped socket into which said wedge and spring pass, and are held firmly, but can be easily removed. While in use the rattling and concussion of the wheels serve to fasten the wedge more firmly into the socket, so that there is no strain upon the spring.

I prevent looseness at the bolts of the shafts or pole by the use of a rubber tube around the bolt, and within the eye of the clip, and compressed by the bolt, so that there is no possibility of noise or undue wear at the bolt, because of the yielding character of the rubber that interposes between the metal parts.

In the drawing, Figure 1 is a section of the clip, wedge, joint, and strap transversely of the axle. Fig. 2 is a plan of the parts, and Fig. 3 is a section through the joint and bolt.

The clip $a$ is made as a strap to go over the axle, and with the bolts $b\ b$ passing through the plate and receiving nuts $c\ c$ for clamping the clip to the axle. These parts are of usual character, except that, on the front side of the clip, is an open wedge-shaped box or socket, $d$, that is of a size and shape to receive the wedge $e$, and the front of this box is notched or sufficiently open for receiving the shank of the knuckle $f$, that projects from the wedge and receives the bolt $i$, which also passes through the jaws $k$ of the strap $l$, the latter being connected in any usual manner with the shafts or pole. The wedge and its socket are of corresponding taper, and the largest ends are upward, so that the wedge will be passed in from above the socket and will settle down and tighten in the socket as the parts are subjected to agitation from the concussion of the wheels on the roadway, therefore there will not be looseness or rattling of the wedge. The wedge $e$ is formed with a recess at its back edge for receiving the spring of the catch $o$, which takes beneath the edge of the box $d$, when the wedge is in place, so as to prevent the wedge being accidentally lifted out of the socket. The lower edge of the wedge stands slightly forward, so that the draft on the shafts tends to tighten the wedge and never to lift it. The eye in the knuckle $f$ is sufficiently large to receive a tube of India rubber within it and around the bolt $i$. This rubber tube is longer than the width of the knuckle, so that it is crowded into the hole before the bolt is put through, and in driving that bolt through the rubber is still further compressed, and prevents any looseness or rattling of the parts. The rubber tube $t$ may be made with flanges that pass between the knuckle $f$ and jaws, as shown, or the hole in the knuckle may be flaring at the ends, so that the rubber filling the same prevents contact of metallic parts of the knuckle and jaw.

I claim as my invention—

The wedge $e$, made with a recess for receiving the spring and catch $o$, in combination with the wedge-shaped socket $d$, upon the clip $a$, constructed as specified, so that the wedge is tightened into the socket by the strain to which it is subjected, as set forth.

Signed by me this 8th day of January, 1872.

J. O. MACLASKY.

Witnesses:
GEO. T. PINCKNEY,
CHAS. H. SMITH.